Jan. 29, 1935.  E. W. CLARK  1,989,547
FREQUENCY INDICATOR
Filed June 24, 1933
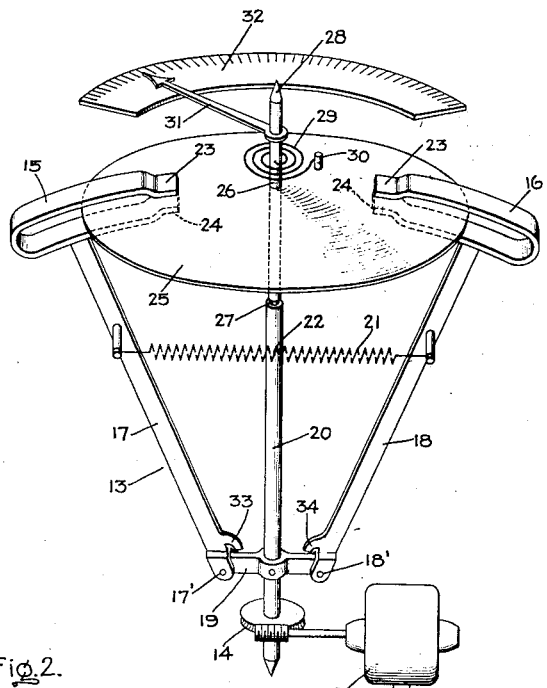
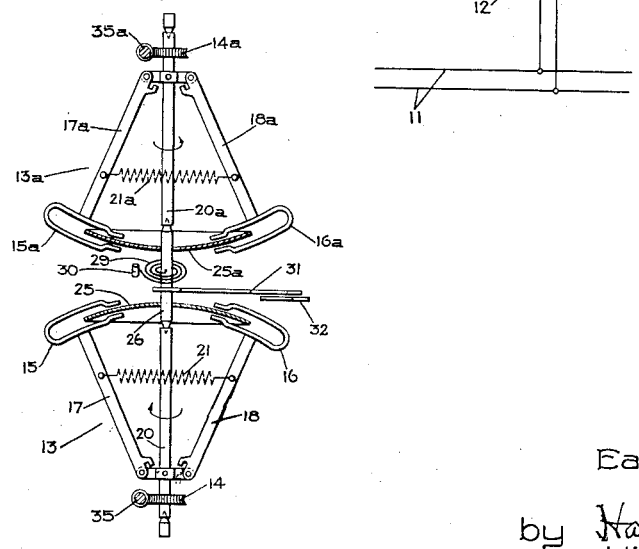
Inventor:
Earl W. Clark,
by Harry E. Dunham
His Attorney.

UNITED STATES PATENT OFFICE 1,989,547

FREQUENCY INDICATOR

Earl W. Clark, East Lynn, Mass., assignor to General Electric Company, a corporation of New York Application June 24, 1933, Serial No. 677,439

10 Claims. (Cl. 235—103.5)

My invention relates to speed and frequency-responsive devices and has for its principal object the production of such devices of increased sensitivity; and in the case of frequency-responsive devices, having an accuracy which is unaffected by variations in the magnitude or wave shape of the applied voltage. Other and further objects will become apparent as the description proceeds.

In connection with alternating-current circuits it is usually desirable to maintain the frequency within a very close range, and since in the average generating systems the maximum deviation is ordinarily a relatively small fraction of the normal frequency, it is desirable to utilize instruments in which the full scale represents a relatively small fractional variation in frequency. For example, in the case of a 60-cycle circuit it is desirable to have a scale covering a fraction of a cycle above and below 60 cycles. In the frequency instruments heretofore used the greatest sensitivity which has been considered practicable for ordinary purposes has been approximately one-half cycle above and below the normal frequency of 60 cycles in the case of 60-cycle instruments, thus giving a scale range of one cycle. In the customary form of frequency meters of the indicating pointer type, a pair of circuits tuned for different frequencies, one above and one below the normal frequency of the circuit being measured, is employed, and the relative variation in the currents in the two circuits, as the frequency of the measured circuit varies, causes the deflection of the instrument pointer. With such instruments designed for 60 cycles normal frequency and having a scale range of one cycle an overall accuracy under normal operating conditions of about 0.02 cycle, e. g., can be obtained in commercial types of instruments. However this accuracy is much less when the applied voltage varies more than approximately 10 per cent or contains more than approximately 6 per cent harmonics, especially the third, fifth, and seventh harmonics. It is an object of my invention to produce a measuring instrument without the disadvantages of prior art instruments, and which may be used as a tachometer as well as a frequency indicator.

In accordance with my invention in its preferred form I employ a synchronous motor energized by an electrical circuit the frequency of which is to be measured and rotating a member carrying one or more revolving magnets cooperating with a spring biased drag disk in a manner somewhat similar to the rotating damping disk and stationary damping magnets used in watt-hour meters and similar devices. The magnets are so mounted that they fly outward by centrifugal force as the frequency and the speed of rotation increase, thereby causing the torque exerted on the drag disk to increase rapidly with respect to the variation in frequency or speed. Owing to the relatively great variation in deflection of the drag disk produced by a given variation in frequency, this construction permits producing instruments of greatly increased sensitivity. For example, this construction may be employed in frequency instruments having a full scale range of 0.2 of a cycle or less.

The features of my invention which I believe to be novel and patentable will be pointed out in the claims appended hereto. A more complete understanding of my invention itself however may be obtained by referring to the following description taken in connection with the accompanying drawing, in which Fig. 1 represents one embodiment of my invention and Fig. 2 represents a differential speed indicator constituting a modification of the device shown in Fig. 1.

Referring now in more detail to the drawing, in which like reference characters refer to like parts throughout I have represented at 11 an alternating-current circuit the frequency of which is to be determined, and at 12 a synchronous motor of any suitable type having its exciting windings connected to the circuit 11. The synchronous motor 12 drives the rotating member 13 through any suitable connection such as the worm gear 14. The rotating member 13 in turn carries the revolving magnets 15 and 16 attached to arms 17 and 18 pivotally connected at 17' and 18' to a cross-arm 19 secured to the shaft 20 of the rotating member 13. The shaft 20 is supported by bearings of any suitable type, not shown.

In order to make the radial position of the revolving magnets 15 and 16 dependent upon the angular velocity of the member 13, suitable yielding restraining means such as a spring 21 or other resilient connection is employed between the arms 17 and 18. If desired the midpoint 22 of the spring 21 may be fastened to the shaft 20. Preferably a plurality of magnets 15 and 16 are employed, and they are symmetrically arranged about the shaft 20 in order to keep the apparatus in dynamic balance. But it will be understood that I am not limited to any given number of magnets and that there may even be applications in which a single magnet might be desirable.

The magnets 15 and 16 are preferably substantially U-shaped with their ends bent to form relatively closely spaced pole portions 23 and 24 in order to produce the maximum flux. A disk 25 of electrically conducting material is provided, which is mounted to permit rotation in the air-gaps between the poles 23 and 24 of the revolving magnets 15 and 16.

Preferably the disk 25 is slightly dished so that the pole faces 23 and 24 will follow the surfaces of the disk 25 as the revolving magnets 15 and 16 swing with the arms 17 and 18 about the pivots 17' and 18', thereby permitting the use of a minimum clearance between the pole faces and the disk. The disk 25 may be mounted upon a shaft 26 having conical pivots 27 and 28 cooperating with suitable bearings, the upper one of which is not shown. The lower pivot 27 may cooperate with a bearing formed in the upper end of the shaft 20 if desired. The disk 25 is biased to a given angular position by means of a suitable means such as a spiral spring 29 attached at one end to the shaft 26 and at the other end to a pin 30 on a stationary member of the apparatus not shown. I have shown a pointer 31 carried by the shaft 26 and cooperating with the scale 32 to provide indications of angular deflection of the disk 25. But it will be understood that my invention is not limited to indicating devices and that it may also be employed in connection with recording instruments, contact-making and breaking instruments, or other form of frequency-responsive apparatus.

Preferably, the apparatus is so constructed that the yoke portions of the magnets 15 and 16 cannot come into contact with the periphery of the disk 25 when the apparatus is shut down and the magnets assume their inmost position. If desired stops 33 and 34, for example, may be provided to accomplish this purpose.

Under certain circumstances it may be desired to compensate for temperature changes in the device. For example, the weakening of the restraining force of the spring 29 with increasing temperature may be compensated for by utilizing a material of a relatively high temperature coefficient of resistivity for the disk 25, so that as the temperature rises the magnitudes of the eddy currents induced in disk 25 and the torque acting upon the disk decrease, but it will be understood that I am not limited to any particular type of temperature compensation. Variations in the strength of the magnets 15 and 16 with the temperature may be compensated for by employing magnetic shunts composed of a material having a negative temperature coefficient of permeability, for example, a material comprising approximately 40 to 20 per cent copper, 60 to 80 per cent nickel, and 2 per cent iron, as described in U. S. Patent 1,706,172 to Kinnard. If desired, temperature compensation may also be obtained by means of bimetallic strips serving as supports for the magnets 15 and 16, for the arms 17 and 18, or serving as supports for the spring 21.

Although I have described an arrangement in which torque is transmitted magnetically to the indicating pointer 31 by the rotating member 13 by means of the pivotally mounted magnets 15 and 16, it will be understood that my invention is not limited to this precise arrangement. It is the purpose of my invention to provide a torque transmitting means by which the deflection of the indicating member increases more rapidly than the variation in angular speed of the rotating member 13, preferably more rapidly than the square of the angular speed. In the arrangement described, centrifugal members comprising magnets are employed, but it will be understood that centrifugal force may be utilized to vary the rate of torque transmission in other ways as well. For example, I may also employ a rotating fluid-containing receptacle cooperating with a spring-biased member in such a manner that the friction between the rotating member and the spring-biased member is caused to increase as the fluid is forced outward by centrifugal force.

The operation of the apparatus will be readily understood from the drawing. Obviously the speed of rotation of the rotating member 13 will be proportional to the frequency of the electric circuit 11 connected to the synchronous motor 12. As will be well understood by those skilled in the art, as the magnets 15 and 16 revolve eddy currents will be induced in the dished disk 25 which will set up magnetic fields tending to oppose the relative motion between the magnets and the disk so that the disk 25 will be dragged in the direction of rotation of revolving magnets until the torque acting on the disk is balanced by the reaction of the biasing spring 29. Since the force between the magnet poles 23 and 24 and the portions of the disk 25 under the poles depends on the magnitude of the eddy currents which in turn depends on the linear speed of the magnetic poles 23 and 24, the torque acting on the disk will depend both on the radial distance of the magnetic poles 23 and 24 from the axis of the disk 25 and on the linear speed. As the centrifugal force acting on magnets 15 and 16, and consequently the radial displacement of the magnets 15 and 16 varies as the product of the square of the angular speed of the rotating member 13 and the distance from the axis of rotation to the center of gravity of the magnets, and the linear speed of the poles 23 and 24 varies as the product of their distance from the axis of rotation and the angular speed of the rotating member 13, it will readily be seen that the torque acting upon the disk 25 varies rapidly with variations in the speed of rotation of member 13 or variations in frequency. Consequently the apparatus may be designed for full scale deflection with a very small variation in frequency.

A conception of the relationship between the torque acting on the disk 25 or its angular deflection and the angular speed of member 13 may be obtained from the following:

The torque varies as the product of the linear speed of the magnet poles and their radius of action. But the linear speed equals the product of the radius of action times the angular speed, so that torque varies as the product of the angular speed and the square of the radius of action.

The length of the radius in turn depends upon the centrifugal force which varies as the square of the angular speed and the distance of the center of gravity of the rotating mass from the axis of rotation. The normal length of the spring 21 or the relative position of attachment can readily be so chosen that the restraining force of the spring is proportional to the radius of action of the poles 23 and 24. (But it will be understood that my invention is not limited to this precise adjustment and that a variation in the length or tension of the spring 21 will result merely in modifying slightly the shape of the speed torque curve of the magnet transmission.) Consequently, the radius can be caused to be proportional to the centrifugal force of the magnets 15 and 16.

As the distance of the centers of gravity of the magnets 15 and 16 from the axis of rotation is continuously increasing with increase in speed, the centrifugal force varies at a rate greater than the square of the angular speed and likewise the radius of action varies at a rate greater than the square of the angular speed.

Since the torque varies as the product of the angular speed and the square of the radius of action, and the radius varies at a rate greater than the square of the angular speed the torque must vary at a rate greater than the fifth power of the angular speed.

Expressing this in mathematical symbols, $$T = K_1 V R \quad (1)$$
$$V = K_2 N R \quad (2)$$

Combining Equations 1 and 2, $$T = K_1 K_2 N R^2 \quad (3)$$
$$F = K_3 N^2 G \quad (4)$$
$$R = K_4 F \quad (5)$$

Combining Equations 4 and 5, $$R = K_3 K_4 N^2 G \quad (6)$$

Since G increases continuously as N increases, $$R > K_5 N^2 \quad (7)$$

Combining expressions 3 and 7, $$T > K_6 N^5 \quad (8)$$
$$\theta = K_7 T \quad (9)$$

Combining expressions 8 and 9, $$\theta > K_8 N^5 \quad (10)$$

where T=torque acting in disk 25

$K_{1-\infty}$ are constants of proportionality.

V=linear speed of theoretical point poles equivalent in effect to poles 23 and 24.

R=equivalent radius of action of poles 23 and 24.

N=angular speed of member 13.

F=centrifugal force acting on the magnets 15 and 16.

G=distance from axis of rotation to centers of gravity of magnets 15 and 16.

$\theta$=angular deflection of pointer 31.

Obviously the apparatus may also be used as a tachometer by employing a suitable mechanical connection between the shaft 20 and a shaft the speed of which is to be measured.

In some applications, such as in paper mill work, where one motor is driven just a few revolutions faster than another in making large rolls, it may be desirable to employ differential speed indicators comprising a pair of units of the type disclosed in Fig. 1. For example, if it is desired to compare the speeds of shafts 35 and 35a, Fig. 2, a pair of similar revolving members 13 and 13a may be employed, with one member connected to each shaft. The parts of the second revolving member 13a are designated by the same reference numerals as the corresponding parts in member 13 with the letter "a" added. The gearing is so arranged that members 13 and 13a revolve in opposite directions. The revolvable disks 25 and 25a are attached to the same shaft 26 so that the torque acting upon the shaft 26 and the deflection of pointer 31 represents the difference in the speeds of shafts 35 and 35a.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A speed-responsive device comprising a rotating member mechanically connected to a device the speed of which is to be measured and carrying a plurality of magnets movably mounted to permit centrifugal motion of said magnets in response to rotation of said rotating member, means opposing said centrifugal motion increasing in strength with centrifugal displacement of said magnets so as to cause a balance between the centrifugal forces of said magnets and the restraining force of said opposing means at radial positions of said magnets dependent upon the angular velocity of said rotating member, a disk substantially coaxial with said rotating member composed of electrically conducting material, means for biasing said disk to a given angular position, and means responsive to the angular position of said disk to provide an indication of angular velocity, said magnets being arranged to have opposite poles on opposite sides of said disk for any radial position of said magnets so that the revolution of said magnets tends to rotate said disk with a torque dependent upon angular speed.

2. A speed-responsive device comprising a rotatable member carrying a plurality of U-shaped magnets mounted on arms pivotally supported by said rotating member and with relatively short air gaps between their pole portions, resilient means tending to draw said magnets inward toward the center of rotation of said rotating member so as to cause a balance between the centrifugal forces of said magnets and restraining force of said resilient means at radial positions of said magnets dependent upon the angular velocity of said rotating member, a dished disk substantially coaxial with said rotating member composed of electrically conducting material placed between the pole pieces of said movable revolving magnets, means for biasing said disk to a given angular position, and means responsive to the angular position of said disk to provide an indication of angular velocity.

3. A speed-responsive device comprising a drag disk of electrically conducting material biased to a given angular position and a rotatable member carrying a movably mounted U-shaped magnet cooperating with said drag disk tending to cause rotation thereof, and resilient means tending to draw said magnet inward toward the center of rotation of said rotating member so as to cause a balance between the centrifugal force of said magnet and the restraining force of said resilient means at a radial position of said magnet dependent upon the angular velocity of said rotating member thereby making the radius of action of the pole portions of said magnet dependent upon the angular velocity of said revolving member and causing the angular position of said disk to provide an indication of angular velocity.

4. A speed-responsive device comprising a pivoted indicating member resiliently biased to a given rotating position, a second member driven at the speed which it is desired to investigate, and means for causing the last-mentioned member to exert a driving torque on the pivoted indicating member against its resilient bias, which torque varies as a function of the speed increasing more rapidly than the third power of the speed.

5. A speed-responsive device comprising a pivoted indicating member resiliently biased to a given rotating position, a second member driven at the speed which it is desired to investigate, and means for causing the last-mentioned member to exert a driving torque on the pivoted indicating member against its resilient bias, which torque varies as a function of the speed increasing more rapidly than the fourth power of the speed.

6. A speed-responsive device comprising a pivoted indicating member resiliently biased to a given rotating position, a second member driven at the speed which it is desired to investigate, and means for causing the last-mentioned member to exert a driving torque on the pivoted indicating member against its resilient bias, which torque varies as a function of the speed increasing more rapidly than the fifth power of the speed.

7. A speed-responsive device comprising a pivoted indicating member resiliently biased to a given rotating position, a second member driven at the speed which it is desired to investigate, and means for causing the last-mentioned member to exert a driving torque on the pivoted indicating member against its resilient bias, which torque varies as the function of the speed which approximates a power of the speed greater than the second.

8. A speed responsive device comprising a pivoted member resiliently biased to a given rotating position, a second member driven at the speed which it is desired to investigate, means for causing the last-mentioned member to exert a driving torque on the pivoted member against its resilient bias, which torque varies as a function of the speed increasing more rapidly than the second power of the speed, and means compensating said device for variations in temperature.

9. A speed responsive device comprising a drag disk of electrically conducting material biased to a given angular position, and a rotatable member carrying a movably mounted magnet cooperating with said drag disk tending to cause rotation thereof, resilient means tending to draw said magnet toward the center of rotation of said rotating member so as to cause a balance between the centrifugal force of said magnet and the restraining force of said resilient means at a radial position of said magnet dependent upon the angular velocity of said rotating member, thereby making the radius of action of the pole portions of said magnet dependent on the angular velocity of said revolving member and causing the angular position of said disk to provide an indication of angular velocity, and means for compensating said device for variations in temperature.

10. A differential speedometer for a pair of shafts comprising a pivoted member resiliently biased to a given rotating position, a pair of members each driven at a speed proportional to the speed of one of said shafts and coaxial with said pivoted members, means for causing each of said last-mentioned members to exert a driving torque on the pivoted member against its resilient bias, each of which torques varies as a function of the speed increasing more rapidly than the second power of the speed of the shaft with which it is associated.

EARL W. CLARK.